United States Patent
Xin et al.

(10) Patent No.: US 8,029,189 B2
(45) Date of Patent: Oct. 4, 2011

(54) COMPUTER AND METHOD OF MONITORING WIND RESISTANCE CHANGES

(75) Inventors: Boyong Xin, Beijing (CN); Jun Wang, Beijing (CN)

(73) Assignees: Beijing Lenovo Software Ltd., Beijing (CN); Lenovo (Beijing) Limited, Beijing (CN)

( * ) Notice: Subject to any disclaimer, the term of this patent is extended or adjusted under 35 U.S.C. 154(b) by 480 days.

(21) Appl. No.: 12/339,977

(22) Filed: Dec. 19, 2008

(65) Prior Publication Data

US 2009/0175311 A1 Jul. 9, 2009

(30) Foreign Application Priority Data

Dec. 21, 2007 (CN) .......................... 2007 1 0303921

(51) Int. Cl.
  *G06F 1/20* (2006.01)
  *H05K 7/20* (2006.01)
(52) U.S. Cl. .......... 374/141; 374/152; 374/45; 702/130; 340/584
(58) Field of Classification Search ................. 374/141, 374/152, 45; 702/130, 132; 700/299; 361/479.46, 361/479.48; 340/584
See application file for complete search history.

(56) References Cited

U.S. PATENT DOCUMENTS

| | | | |
|---|---|---|---|
| 6,466,132 B1 * | 10/2002 | Caronna et al. ............... 340/584 |
| 6,873,929 B2 * | 3/2005 | Lai et al. ....................... 702/132 |
| 6,881,142 B1 * | 4/2005 | Nair ............................... 454/186 |
| 7,139,169 B2 * | 11/2006 | Alperin et al. ............. 361/679.4 |
| 7,463,950 B1 * | 12/2008 | Brey et al. ..................... 700/299 |
| 7,532,467 B2 * | 5/2009 | Launay et al. ........... 361/679.48 |
| 7,535,711 B2 * | 5/2009 | Saegusa et al. ............... 361/695 |
| 7,714,731 B2 * | 5/2010 | Palaszewski .................. 340/584 |
| 7,806,344 B2 * | 10/2010 | Chang .......................... 236/49.3 |
| RE42,195 E * | 3/2011 | Bash et al. ..................... 700/276 |
| 7,933,737 B2 * | 4/2011 | Gross et al. ................... 702/130 |
| 7,941,283 B2 * | 5/2011 | Gross et al. ..................... 702/45 |
| 2007/0047199 A1 * | 3/2007 | Tsutsui ......................... 361/687 |
| 2007/0144354 A1 * | 6/2007 | Muller et al. ................... 96/417 |
| 2008/0300818 A1 * | 12/2008 | Brey et al. ..................... 702/130 |
| 2009/0210190 A1 * | 8/2009 | Carlson et al. ............... 702/130 |
| 2009/0249862 A1 * | 10/2009 | Glover et al. ................ 73/30.04 |
| 2009/0296342 A1 * | 12/2009 | Matteson et al. ........ 361/679.46 |

* cited by examiner

*Primary Examiner* — R. A. Smith
(74) *Attorney, Agent, or Firm* — Osha • Liang LLP

(57) ABSTRACT

The present invention relates to a computer and a method of monitoring wind resistance changes. The computer comprises a wind resistance change monitoring device, the device comprising: one or more first temperature sensors, located at one or more positions inside the computer where an actual ambient temperature can be monitored, and configured to sense one or more ambient temperatures as first temperature; one or more heaters, located at the front end of a cooling duct of the computer, and configured to work at a rated power; one or more second temperature sensors, located corresponding to the one or more heaters, and configured to sense one or more temperatures of the one or more heaters as second temperature; and a control module configured to determine whether the wind resistance of the computer has changed or not based on a comparison of the relationship between the first and second temperature with the relationship between a predetermined ambient temperature and a predetermined heater temperature.

8 Claims, 3 Drawing Sheets

COMPUTER AND METHOD OF MONITORING WIND RESISTANCE CHANGES

BACKGROUND OF THE INVENTION

1. Field of Invention

The present invention relates to the computer and communication field, and more particularly, to a computer and a method of monitoring wind resistance changes for a computer.

2. Description of Prior Art

Currently most computers radiate heat in an air-cooled manner. Changes of a system wind resistance will affect the system heat radiation, reducing the system reliability.

It is necessary for dust-proof computers with a configuration of dustproof screen to monitor dust on the dustproof screen so as to remind a user to wash the dustproof screen in time.

A prior art solution is to measure an airflow which actually passes through the dustproof screen, compare it with a predetermined normal airflow which should pass through a dustproof screen without dust, and make an alarm when the measured airflow has decreased to a certain value.

However, this solution is complex, and requires monitoring wind speeds at multiple locations. Thus, its cost is high. Further, for different structures, locations where the wind speeds are monitored should be different, so it is not adapted to systems with fan speed adjusting function.

Therefore, there is a need for a method of monitoring the wind resistance of a computer, so as to monitor effects of operation environments on the reliability of operations of the computer, such as heat radiation.

SUMMARY OF THE INVENTION

In order to accurately monitor a wind resistance of a computer and to decrease the cost for monitoring, the present invention provides a computer and a method of monitoring wind resistance changes for a computer by means of monitoring temperature differences, which is applicable to modern computers so as to adjust fan speed.

According to an aspect of the present invention, there is provided a computer comprising a wind resistance change monitoring device, the device comprising: one or more first temperature sensors, located at one or more positions inside the computer where an actual ambient temperature can be monitored, and configured to sense one or more ambient temperatures as first temperature; one or more heaters, located at the front end of a cooling duct of the computer, and configured to work at a rated power; one or more second temperature sensors, located corresponding to the one or more heaters, and configured to sense one or more temperatures of the one or more heaters as second temperature; and a control module configured to determine whether the wind resistance of the computer has changed or not based on a comparison of the relationship between the first and second temperature with the relationship between a predetermined ambient temperature and a predetermined heater temperature.

According to another aspect of the present invention, there is provided a method of monitoring wind resistance changes for a computer, comprising steps of: sensing an ambient temperature around a first temperature sensor, which is provided inside the computer and is configured to monitor the actual ambient temperature, as a first temperature, and sensing one or more temperatures of one or more heaters located at different positions at the front end of a cooling duct of the computer as second temperature, wherein the one or more heaters are configured to work at a rated power; and determining whether the wind resistance of the computer has changed or not based on a comparison of the relationship between the first and second temperature with the relationship between a predetermined ambient temperature and a predetermined heater temperature.

The structure and function according to the present invention are easy to realize, with little cost increasing. Further, there is no need to carry out monitoring at multiple locations, and the control accuracy is higher. Moreover, due to the fact that the monitoring is performed based on temperature differences, it is applicable to modern computers so as to adjust fan speed.

BRIEF DESCRIPTION OF THE DRAWINGS

The drawings illustrated here are intended to provide further understanding on the is present invention, and constitute a part of this application. Exemplary embodiments of the present invention and illustrations thereof are provided for the purpose of explaining the present invention, not to improperly limit the invention. In the drawings:

FIG. 3A and FIG. 5B are schematic diagrams showing a specific computer (or server) according to an embodiment of the present invention.

DETAILED DESCRIPTION OF PREFERRED EMBODIMENTS

Figure 1A:
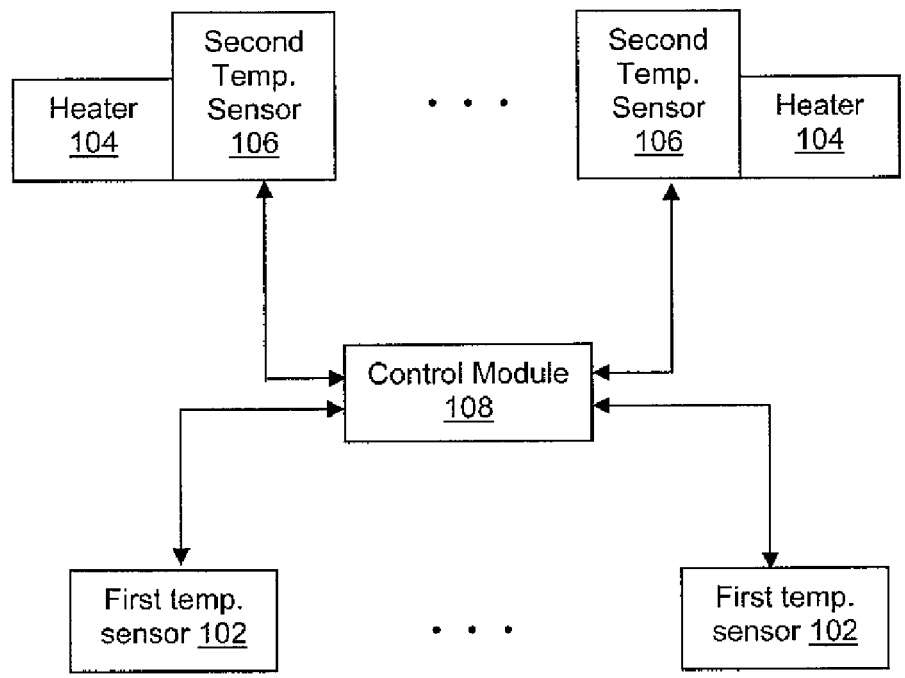
FIG. 1A and FIG. 1B are block diagrams showing a wind resistance change monitoring device included in a computer according to an embodiment of the present invention.
Figure 1B:
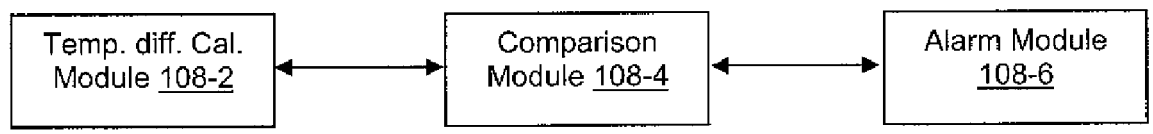

FIG. 1A and FIG. 1B are block diagrams showing a computer comprising a wind resistance change monitoring device according to an embodiment of the present invention. As shown in FIG. 1A, the computer comprising the wind resistance change monitoring device according to the embodiment comprises:

one or more first temperature sensors 102, located at one or more positions inside the computer where an actual ambient temperature can be monitored, and configured to sense one or more ambient temperatures as first temperature;

one or more heaters 104, located at the front end of a cooling duct of the computer, and configured to work at a rated power;

one or more second temperature sensors 106, located corresponding to the one or more heaters, and configured to sense one or more temperatures of the one or more heaters as second temperature; and a control module 108 configured to determine whether the wind resistance of the computer has changed or not based on a comparison of the relationship between the first and second temperature with the relationship between a predetermined ambient temperature and a predetermined heater temperature, wherein, if the one or more ambient temperatures are different, an average of the one or more ambient temperatures is used as the first temperature, and the control module sets the predetermined ambient temperature and the predetermined heater temperature based on a duty ratio of a fan inside the computer.

As shown in FIG. 1B, the control module 108 comprises: a temperature difference calculation module 108-2 for calculating an absolute difference value between the first temperature and the second temperature as a first absolute value, and calculating an absolute difference value between the predetermined ambient temperature and the predetermined heater temperature as a second absolute value; a comparison module 108-4 for comparing the first absolute value with the second absolute value; and an alarm module 108-6 for making an alarm if the first absolute value is greater than the second absolute value by a predetermined offset value.

Figure 2:
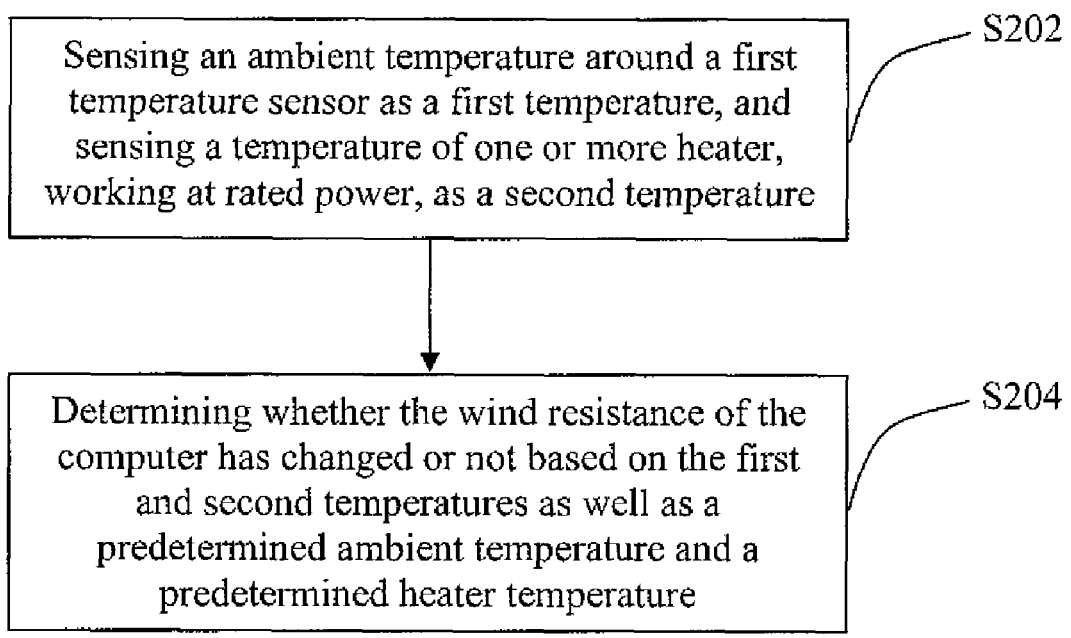
FIG. 2 is a block diagram showing a method of monitoring wind resistance changes for a computer according to an embodiment of the present invention.

FIG. 2 is a block diagram showing a method of monitoring wind resistance changes according to an embodiment of the present invention. As shown in FIG. 2, the method of monitoring wind resistance changes for the computer according to the embodiment comprises steps of:

Step S202, sensing the ambient temperature around the first temperature sensor, which is provided inside the computer and is configured to monitor the actual ambient temperature, as the first temperature, and sensing one or more temperatures of the one or more heaters located at different positions at the front end of the cooling duct of the computer as the second temperature, wherein the one or more heaters are configured to work at the rated power; and Step S204, determining whether the wind resistance of the computer has changed or not based on the comparison of the relationship between the first and second temperature and the relationship between the predetermined ambient temperature and the predetermined heater temperature, Wherein, if the ambient temperatures sensed by the first temperature sensors are different, an average of the ambient temperatures is used as the first temperature, and the predetermined ambient temperature and the predetermined heater temperature are set based on a duty ratio of a fan inside the computer.

Step S204 includes: step a, calculating the absolute difference value between the first temperature and the second temperature as the first absolute value, and calculating the absolute difference value between the predetermined ambient temperature and the predetermined heater temperature as the second absolute value; step b, comparing the first absolute value with the second absolute value; and step c, the alarm module making an alarm if the first absolute value is greater than the second absolute value by the predetermined offset value.

Figure 3A:
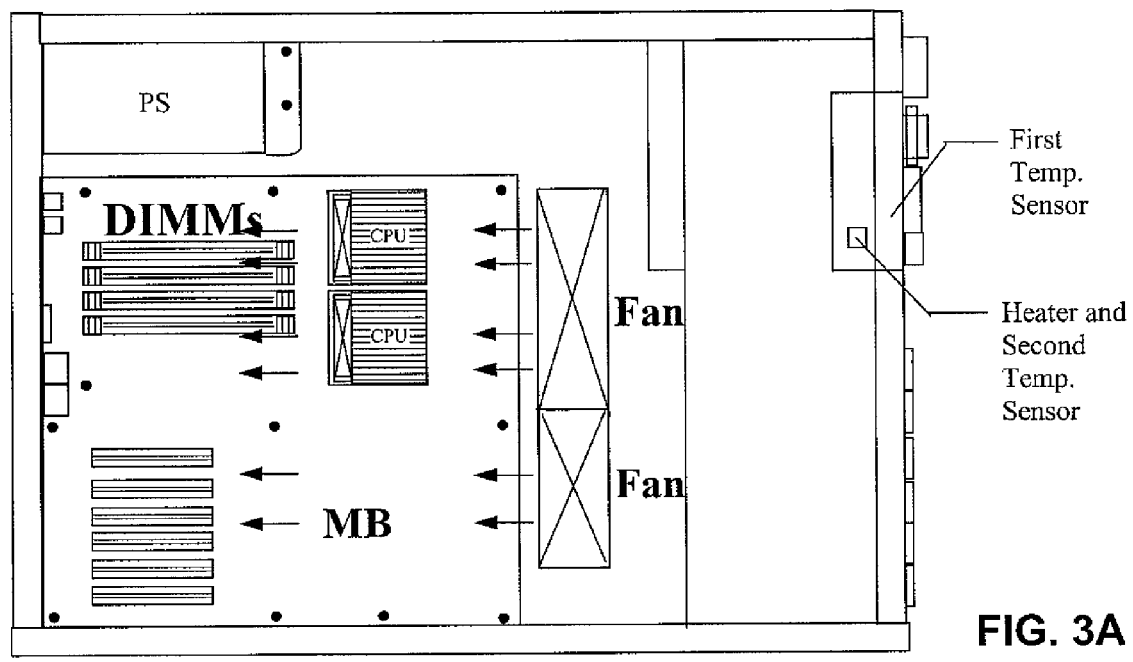
Figure 3B:
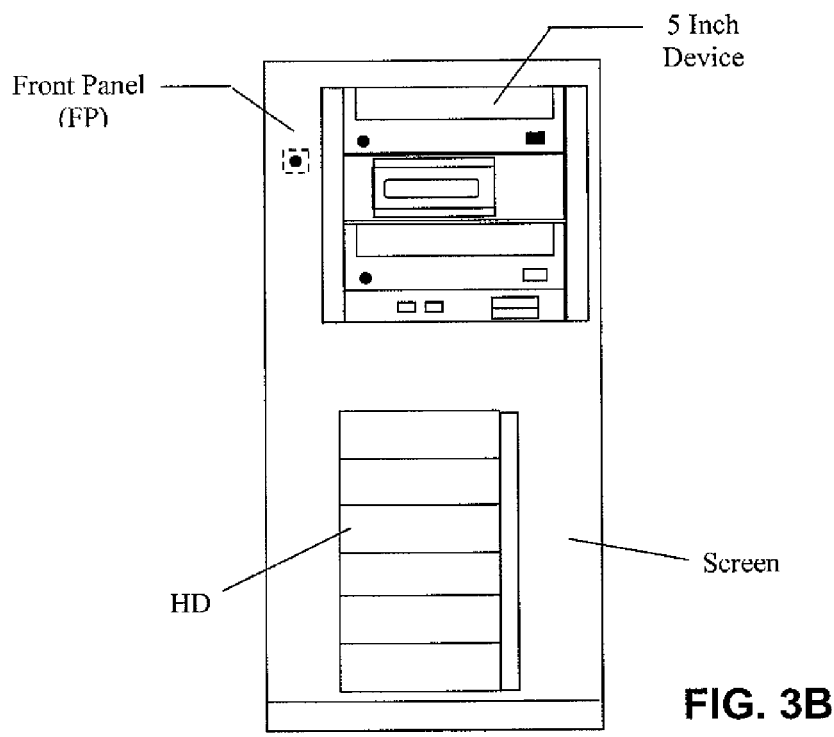

An application of the present invention to a system with fan speed adjusting function, so as to carry out dustproof monitor on a computer with a dustproof function and to remind a user to wash a dustproof screen, is described by way of example, with reference to FIG. 3A and FIG. 3B.

One or more first temperature sensors are provided at one or more locations where a computer FP can monitor the actual ambient temperature for sensing the ambient temperature. The system adjusts the fan speed based on the sensed ambient temperature. Here, the first temperature assumes a value of Ta, and in a case where the ambient temperatures sensed by the first temperature sensors are different, an average of the ambient temperatures is used as the first temperature.

Likewise, a heater with a rated heating power (e.g. a rated power of 2 W) and a heater temperature sensor (the second temperature sensor) for sensing the temperature of this heater are provided at the front end of a cooling duct of the FP board. Here, the temperature assumes a value of Tc.

No matter how the system is configured and no matter whether the load on the system is great or small, the heater works at the rated power. Further, there is no other heater between this heater and the dustproof screen, so that the only factor affecting Tc is the airflow passing therethrough. The wind resistance is monitored by comparing the difference between Tc and Ta which are measured during practical operations with the difference between predetermined Tc and Ta in the normal state of the system.

The ambient temperature and the heater temperature are measured, under a series of different duty ratios of the fan in a case where the dustproof screen cannot work normally (i.e. there is too much dust), as Ta1, Ta2, Ta3 . . . Tan and Tc1, Tc2, Tc3 . . . Tcn respectively (as shown in table 1). Let the difference between Tc and Ta under a certain duty ratio is Y. In practical operations, if the difference X (which may be an absolute value) between the predetermined heater temperature Tcs and the predetermined ambient Tas approaches Y with an offset of Z, that is, if $Xn \geq Yn - Zn$, the system makes an alarm.

TABLE 1

| PWM | PWM1 | PWM2 | PWM3 | ... | PWMn |
|---|---|---|---|---|---|
| Ta | $Ta_1$ | $Ta_2$ | $Ta_3$ | ... | $Ta_n$ |
| Tc | $Tc_n$ | $Tc_n$ | $Tc_n$ | ... | $Tc_n$ |
| Y = Tc − Ta | $Y_1$ | $Y_2$ | $Y_3$ | ... | $Y_n$ |
| Z | $Z_1$ | $Z_2$ | $Z_3$ | ... | $Z_n$ |
| X = Tcs − Tas | $X_1$ | $X_2$ | $X_3$ | ... | $X_n$ |

The present invention has the following advantages.

$_1$The system is easy to realize in terms of structure and function, with little cost increasing.
$_2$There is no need to carry out monitoring at multiple locations, and the control accuracy is higher.
$_3$It is applicable to fan speed adjusting systems of modern computers due to the fact that the monitoring is performed based on temperature differences.

Those above described are only preferred embodiments of the present invention, and are not intended to limit the present invention. For those skilled in the art, there may be various modifications and changes. Any modifications, equivalent replacements and improvements without departing from the principle and concept of the present invention fall into the scope of the present invention.

What is claimed is:

1. A computer comprising a wind resistance change monitoring device, the wind resistance change monitoring device comprising:
   one or more first temperature sensors, located at one or more positions inside the computer where an actual ambient temperature can be monitored, and configured to sense one or more ambient temperatures as a first temperature;
   one or more heaters, located at the front end of a cooling duct of the computer, and configured to work at a rated power;
   one or more second temperature sensors, located corresponding to the one or more heaters, and configured to sense one or more temperatures of the one or more heaters as a second temperature; and
   a control module configured to determine whether the wind resistance of the computer has changed or not based on a comparison of the relationship between the first and second temperature with the relationship between a predetermined ambient temperature and a predetermined heater temperature.

2. The computer according to claim 1, wherein, if the one or more ambient temperatures are different, an average of the one or more ambient temperatures is used as the first temperature.

3. The computer according to claim 2, wherein the predetermined ambient temperature and the predetermined heater temperature are set based on a duty ratio of a fan inside the computer.

4. The computer according to claim 1, wherein the control module comprises:
- a temperature difference calculation module for calculating an absolute difference value between the first temperature and the second temperature as a first absolute value, and calculating an absolute difference value between the predetermined ambient temperature and the predetermined heater temperature as a second absolute value;
- a comparison module for comparing the first absolute value with the second absolute value; and
- an alarm module for making an alarm if the first absolute value is greater than the second absolute value by a predetermined offset value.

5. A method of monitoring wind resistance changes for a computer, comprising steps of:
- step one, sensing an ambient temperature around a first temperature sensor, which is provided inside the computer and is configured to monitor the actual ambient temperature, as a first temperature, and sensing one or more temperatures of one or more heaters located at different positions at the front end of a cooling duct of the computer as a second temperature, wherein the one or more heaters are configured to work at a rated power; and
- step two, determining whether the wind resistance of the computer has changed or not based on a comparison of the relationship between the first and second temperature with the relationship between a predetermined ambient temperature and a predetermined heater temperature.

6. The method according to claim 5, wherein if there are a plurality of the first temperature sensors and the temperatures sensed by the first temperature sensors are different, an average of the sensed temperatures is used as the first temperature.

7. The method according to claim 6, wherein the predetermined ambient temperature and the predetermined heater temperature are set based on a duty ratio of a fan inside the computer.

8. The method according to claim 5, wherein said step two comprises:
- step a, calculating an absolute difference value between the first temperature and the second temperature as a first absolute value, and calculating an absolute difference value between the predetermined ambient temperature and the predetermined heater temperature as a second absolute value;
- step b, comparing the first absolute value with the second absolute value; and
- step c, making an alarm if the first absolute value is greater than the second absolute value by a predetermined offset value.

* * * * *